G. S. RODD.
STEERING WHEEL INDICATOR.
APPLICATION FILED SEPT. 15, 1915.
1,217,105.
Patented Feb. 20, 1917.
2 SHEETS—SHEET 2.
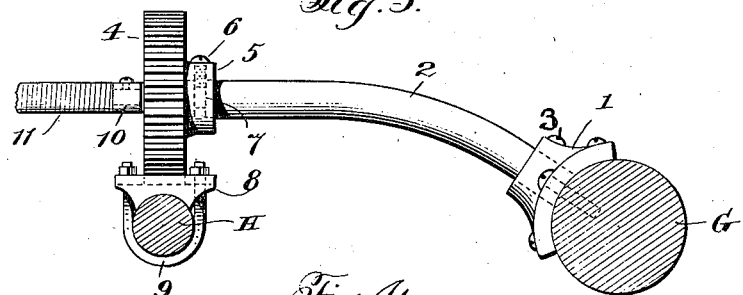
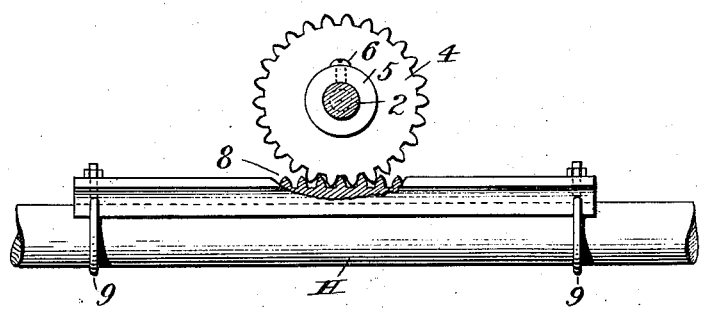
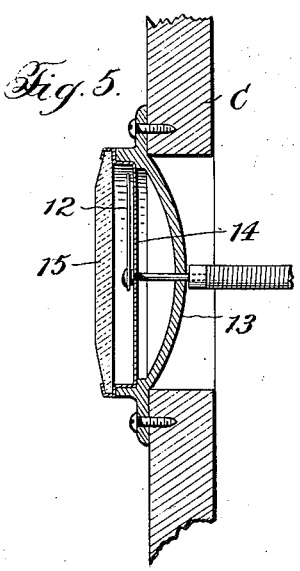
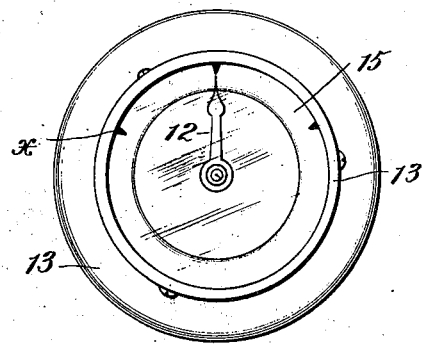
Witness
Jas. E. Hutchinson
Inventor:
George S. Rodd,
By
Munn & Means
Attorneys

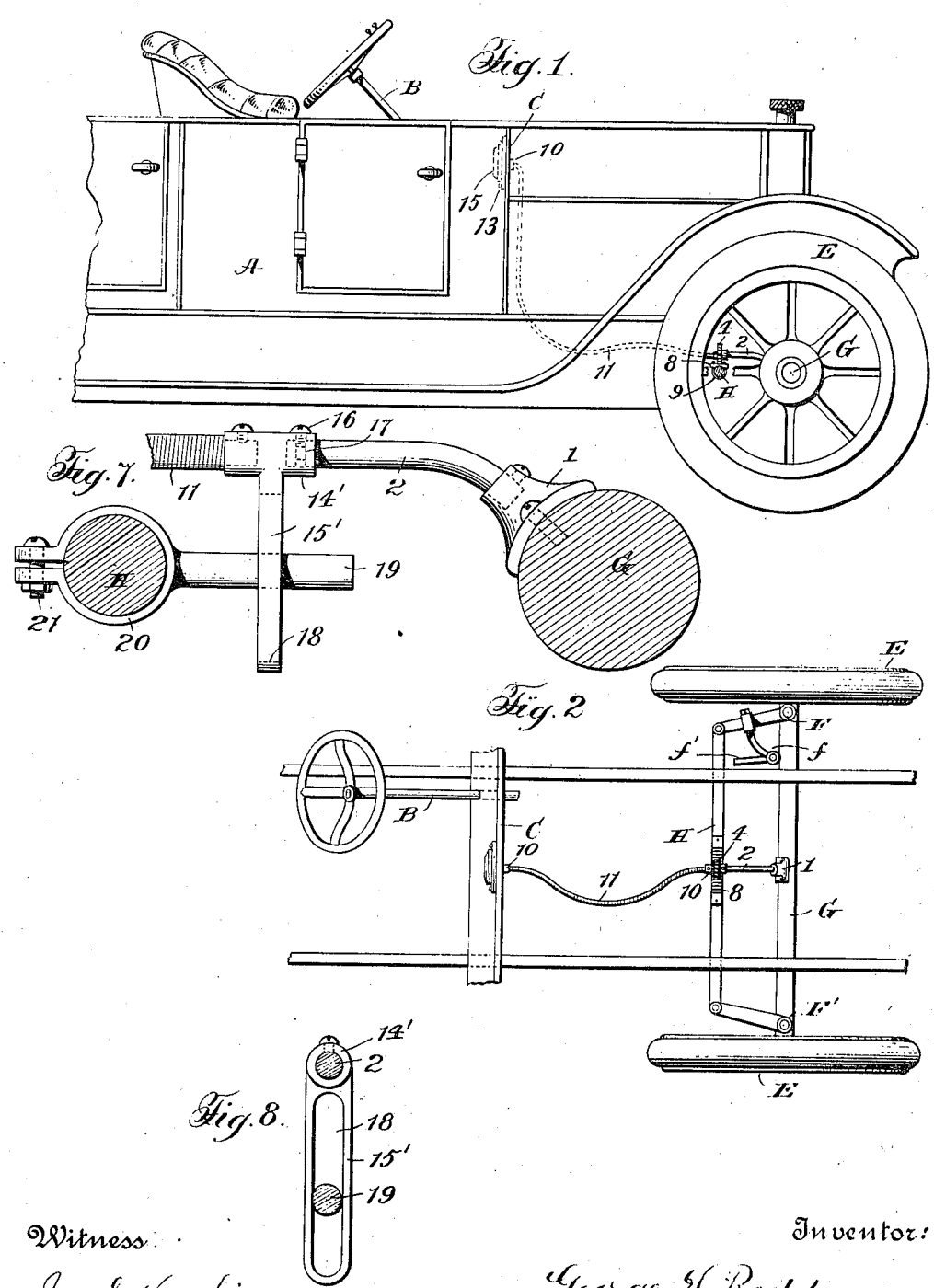

UNITED STATES PATENT OFFICE.

GEORGE S. RODD, OF HOUGHTON, MICHIGAN.

STEERING-WHEEL INDICATOR.

1,217,105.  Specification of Letters Patent.  Patented Feb. 20, 1917.

Application filed September 15, 1915. Serial No. 50,856.

*To all whom it may concern:*

Be it known that I, GEORGE S. RODD, a citizen of the United States, residing at Houghton, in the county of Houghton and State of Michigan, have invented certain new and useful Improvements in Steering-Wheel Indicators, of which the following is a specification, reference being had therein to the accompanying drawing.

This invention relates to improvements in steering wheel indicators.

Primarily the invention is designed for application to automobiles, especially automobiles wherein the forward or steering wheels are mounted on knuckles, while the axle which supports the load is stationarily positioned with relation to the frame of the car. Drivers of automobiles frequently encounter the difficulty of ascertaining the exact position of the front or steering wheels of the machine when in the act of starting the car. Frequently, an operator will adjust the steering wheels when he leaves the car and owing to the fact that the wheels are below the fenders, they cannot be seen by the operator when in his seat, and he is therefore unable to tell exactly the position the steering wheels were left in when the car was stopped. Often in manipulation in garages, cars are started forward and owing to the improper position of the steering wheels collisions occur. There are other situations wherein it is very desirable for the operator to know at a glance, the location and angular position of the steering wheel, prior to starting his car. It is also often desirable to have some readily adjustable means for ascertaining the alinement of the forward steering wheels. One of the objects of the present invention is the provision of such a device.

The present invention is designed to provide an indicator, whereby the position or angular adjustment of the steering wheels is indicated at a point well within the vision of the operator. Heretofore, steering wheel indicators have been suggested, but as far as I am now advised, such suggestions have been adaptable for use in connection with special car structures only.

The present invention is designed as an equipment for the usual type of automobile and is applicable to that type wherein the wheels are carried by knuckles, the latter being united by the usual cross connection and with the steering post.

It is another important object of the invention to provide an indicating mechanism which when the steering wheels and parts of the mechanism therefor are properly adjusted and the steering wheels lie in alinement with the rear wheels of the automobile the pointer is set at zero, it being understood that the parts of the mechanism are usually properly adjusted before the automobile leaves the factory. If, however, after use the steering mechanism should become loose or disarranged the pointer will immediately indicate this improper relation of the parts of the mechanism.

In the accompanying drawing, there is shown a structure embodying the invention, but it is to be understood that various changes and modifications can be made without departing from the general principles of the invention.

Figure 1 represents a side elevation of the forward part of an automobile, showing the position of the attachment.

Fig. 2 is a plan view of the attachment showing the body of the machine removed, and parts in section, the general running gear structure being shown somewhat diagrammatically.

Fig. 3 is an elevation of the operating parts of the attachment showing the axle and connecting bar in section.

Fig. 4 is a front elevation of Fig. 3.

Fig. 5 is a section of the indicator; and

Fig. 6 is an elevation of the dial and pointer.

Fig. 7 is an elevation of a modified form of device, and,

Fig. 8 is a detail view of the modified form of the device. showing parts thereof in section.

A designates the body of an automobile, B the steering post, C the dash, E the forward steering wheels, F and F' the usual knuckle structure for supporting the steering wheels, G the front axle, and H the connecting bar for the arms of the knuckles F and F'. The knuckle F is provided with the usual crank arm $f$ with which the steering rod $f'$ engages and is operable as usual from the steering post B. These parts are of the usual construction, the specific illustrations of the various details being omitted as they are well known in the art. Mounted on the axle G in any convenient manner, is a socket member 1 from which extends a carrying arm 2. This arm is conveniently adjustably secured in the socket 1 and held in position by a set screw 3. (See Fig. 3). The arm 2 is extended rearward and carries on its outer end a pinion 4, the latter being provided with a hub 5, fixedly held against sidewise movement but permitting a rotary movement on the arm 2 through the instrumentalities of a key member 6 passing through the hub 5 and entering an annular groove or channel 7 in the end of the arm 2 as shown in dotted lines in Fig. 3. By this means, the pinion or gear 4 is held in its proper position on the end of the arm 2. Clipped to the connecting bar H is a rack member 8 extending lengthwise of the connecting bar and being of a width substantially twice the width of the gear 4. A convenient manner of securing the rack bar on the connecting rod H is provided, the same consisting of a plurality of U-shaped clips 9, embracing the connecting bar and projecting through openings in the ends of the rack bar. The underside of the rack bar is fashioned to fit the upper side of the connecting bar H.

Extending rearwardly from the center of the pinion or gear 4 is a relatively small lug or pintle 10 to which is fixedly connected a flexible shaft 11. The shaft 11 is extended rearwardly in any convenient manner and upward to a point on the dash C, adjacent the steering post and carries on its extreme end a pointer 12. The pointer is located in a housing 13, fixed to a dash in the rear wall of which the end of the flexible shaft is journaled. 14 designates a dial or indicator plate positioned back of the pointer 12 and having proper indicating marks thereon. 15 is a glazed front for the indicator housing. The special form of indicator shown is unimportant as any desired or known type of indicator may be employed in connection with the above described operating means.

In Figs. 7 and 8, there is shown a preferred construction of mechanism for operating the indicator. In this form the axle arm and the attaching sockets 1, 2 and G, are of a construction similar to the construction of those parts shown in the other figures. On the outer end of the part 2 there is sleeved loosely a cylindrical socket 14', through which is fitted a set screw 16 entering a groove 17 in the end of the arm so that the socket member has a rotary movement with relation to the arm. Fixedly keyed in the opposite end of the socket member 14' is the end of the flexible shaft 11, which extends to the indicator. Depending from the under side of the socket member 14 is an elongated arm 15' having an oblong vertically disposed slot 18 therein. Adjustably secured on the connecting bar H is a pin member 19, the same extending forwardly in a horizontal plane and passing through the elongated slot 18 of the depending arm 15', as shown in Fig. 7. The operating pin 19 is conveniently an extension of a collar 20 which embraces the connecting bar H, the collar being split and provided with projecting flanges through which suitable binding screws 21 pass. By this means the collar can be adjusted accurately to the position on the connecting bar H, but manifestly other means for connecting the operating pin with the bar H may be resorted to.

The operation of this preferred form will be readily understood. Any lengthwise movement of the connecting bar will cause the depending arm 15' to move in a rotary direction, thus operating the indicator in front of the dial. When the car to which the device is applied has its forward wheels properly adjusted, the pin 19 will be directly centrally disposed. Should the wheels get out of alinement the knuckles would be improperly turned or positioned, said improper positioning being indicated by the pointer. It is to be understood, of course, that in lieu of the flexible shaft, any well known gearing may be employed.

The hand wheel of the steering post of an automobile is frequently turned one and a half times when it is desired to throw the steering wheels to the maximum angle of adjustment. It is therefore quite apparent that it is necessary to so adjust the indicator attachment that the pointer will move less than a complete revolution when such maximum adjustment is being made. With this in view, the gearing is to be so proportioned that a full or maximum movement of the connecting rod H will turn the arm through a partial revolution only so as to carry the pointer 12 conveniently to the point marked $x$ in Fig. 6. This will permit a proper indication of the pointer throughout the entire maximum movement of the steering wheel. The same action takes place when the steering wheels are operated in reversed directions. I have shown the rack bar 8 as being straight as distinguished from curved, owing to the fact that the straight form is more economical in manufacturing. The width of the bar is such that as the connecting bar H approaches the axle G, the teeth of the gear 4 will move lengthwise of the teeth of the rack, this sliding movement being permitted as the engagement between the teeth is not necessarily binding. These may be lubricated if desired. The means for supporting the gear 4 above described may of course be altered or changed to suit the character of the axle. The device can be otherwise supported if desired. It is to be understood also that various means other than that shown, may be employed for communicating the movement of the gear 4 to the pointer.

In operation, the pointer or indicator being positioned on the dash or in close proximity to the steering post and the hand wheel, the operator will be able to see at a glance the exact position of the steering wheels. When the wheels are in proper alinement with the rear wheels, or "straight," the pointer will be at its highest point or central as shown in Fig. 6. Any deflection of the wheels will be indicated by the pointer.

It will be observed that the attachment can be readily applied to the modern automobile with little trouble and expense.

Having thus described the invention, what I claim and what is desired to be secured by Letters Patent is:

1. In a motor vehicle, the combination with the forward wheels thereof, means for adjusting the same, an indicator, means for operating the indicator upon the adjustment of the wheels, said means comprising a flexible shaft, an arm, means for supporting the arm independently of the steering wheel adjusting means, and a projection mounted to move with the wheels transversely of the machine.

2. In combination with the forward axle, knuckle members pivoted at the ends thereof, wheels on the knuckle members, a connecting bar between the knuckles, means for moving the knuckles to change the angular position of the wheels, an arm, means for fixedly supporting the same from the axle, a projection associated with said connecting bar and engaging the arm to shift the same when the wheels are moved transversely of the axle, and an indicator having a connection with said arm.

3. In a motor vehicle, the combination with the forward axle and steering wheels, means for angularly adjusting the steering wheels, an arm, means for supporting the same on the axle, a movable member operable upon the transverse adjustment of the wheels to operate the arm, an indicator, and a connection between the indicator and the arm.

4. The combination with the forward axle of a motor vehicle, of an arm attached thereto, a slotted arm rotatably supported on the said other arm, knuckle members on the axle, wheels on the knuckles, a connecting bar between the knuckles, a steering mechanism for operating the knuckles to angularly adjust the wheels, projecting means on the connecting bar engaging the slotted arm, an indicator, and operating means between the indicator and the slotted arm.

5. The combination with a vehicle axle, of steering wheels pivotally attached thereto, an indicator, and means for operating said indicator upon a transverse movement of the wheels comprising a depending member supported upon the axle for a swinging movement and having a connection with the indicator, and means carried by the steering mechanism for engaging and shifting said member upon a transverse movement of the wheels.

6. In a motor vehicle, the combination with an axle and the forward wheels thereof, means for adjusting the same, an indicator, an arm fixedly mounted on said axle and extending rearwardly therefrom, a second arm mounted on said first mounted arm for a rotary movement independently thereof, means connecting said last mentioned arm with the indicator, and a connection between the last mentioned arm and the steering mechanism for actuating the same upon a lateral movement of the forward wheels.

7. An indicator for a vehicle having movable front wheels and an axle therefor, a steering mechanism for shifting the wheels, a supporting member carried by said axle and extending rearwardly therefrom, an indicator, indicator operating means comprising a rotatable member journaled on the supporting member fixedly attached to the axle and movable independently thereof for actuating the indicator, and means coöperating with the steering mechanism for rotating the said operating member upon the shifting of the steering wheels.

8. The combination with an axle having attached thereto transversely movable steering wheels, mechanism for shifting said wheels, an indicator, means for operating said indicator upon a transverse movement of the wheels comprising an arm supported by the axle and having a depending part, and a member movable transversely of the axle and attached to the steering mechanism for shifting said depending part to rotate the arm, and means connecting said arm with the indicator.

9. In a motor vehicle, the combination with a forward axle, of steering wheels therefor, operating mechanism for the steering wheels including a connecting bar, an arm supported by the axle and carrying a member operatively associated with the connecting bar and shifted thereby, an indicator located upon the dash-board of the vehicle, the said operating member being provided with a coupling portion, and a driving device attached to said coupling portion and connected with the indicator for actuating the indicator upon the shifting of the steering mechanism.

10. In a motor vehicle, the combination with a forward axle, of steering wheels therefor, operating mechanism for said steering wheels including a cross bar, an indicator supported upon the dash-board of the vehicle, means for operating the said indicator comprising an operating member having a driving connection with the cross bar, the said member being provided with a coupling portion on its rear end, and a flexible shafting attached to said coupling portion and connected with the indicator for operating the indicator upon the shifting of the steering wheels.

11. In a motor vehicle, the combination with an axle, of steering wheels therefor, mechanism for shifting said wheels, an indicator disposed upon the dash-board of the vehicle rearwardly of the steering mechanism, means for operating said indicator comprising a fixed arm, means for supporting said arm, a slotted plate depending from said arm and having a coupling portion projecting beyond each side thereof, the coupling portion on one side of the slotted plate providing an attaching means to mount the same on the arm, a pin carried by the steering mechanism and entering the slot in said plate for shifting the same upon the operation of the steering mechanism, and a flexible shafting connected to the coupling member on the other side of said slotted plate and extending rearwardly of the plate and fastened to the indicator, for the purpose described.

12. In a motor vehicle, the combination with a forward axle, of steering wheels therefor, operating mechanism for shifting said steering wheels, an indicator, means for operating said indicator comprising an arm carrying a member adapted to be shifted upon a movement of the steering mechanism, the said member being provided with a coupling portion, and a driving device attached to said coupling portion and connected with the indicating mechanism, for the purpose described.

13. In a motor vehicle, the combination with a forward axle, of steering wheels therefor, operating mechanism for said steering wheels including a cross bar, an indicator, means for operating the indicator comprising an operating member having a driving connection with the cross bar, means for supporting said member, the said member being provided with a coupling portion, and a connection between said coupling portion and the indicator, substantially as described.

In testimony whereof I hereunto affix my signature in the presence of two witnesses.

GEORGE S. RODD.

Witnesses:
GRACE F. HIND,
JOHN M. WAGNER.